(12) United States Patent
Cho et al.

(10) Patent No.: US 11,673,491 B2
(45) Date of Patent: Jun. 13, 2023

(54) SUPPORT DRIVER FOR SEAT AND SUPPORT ASSEMBLY INCLUDING SAME

(71) Applicant: DAECHANG SEAT CO., LTD-DONGTAN, Gyeonggi-do (KR)

(72) Inventors: Chan Ki Cho, Gangwon-do (KR); Gun Young Park, Incheon (KR); Jin Oh Kim, Gyeonggi-do (KR); Jun Kyu Park, Gyeonggi-do (KR); Jeon Il Kang, Chungcheongnam-do (KR)

(73) Assignee: DAECHANG SEAT CO., LTD-DONGTAN, Gyeonggi-Do (KR)

( * ) Notice: Subject to any disclaimer, the term of this patent is extended or adjusted under 35 U.S.C. 154(b) by 0 days.

(21) Appl. No.: 17/316,302

(22) Filed: May 10, 2021

(65) Prior Publication Data

US 2022/0314845 A1    Oct. 6, 2022

(30) Foreign Application Priority Data

Apr. 2, 2021 (KR) .......................... 10-2021-0043545

(51) Int. Cl.
*B60N 2/66* (2006.01)
*B60N 2/62* (2006.01)
*B60N 2/23* (2006.01)
*B60N 2/02* (2006.01)
*B60N 2/68* (2006.01)

(52) U.S. Cl.
CPC ........... *B60N 2/233* (2013.01); *B60N 2/0232* (2013.01); *B60N 2/62* (2013.01); *B60N 2/6673* (2015.04); *B60N 2/68* (2013.01)

(58) Field of Classification Search
CPC .. B60N 2/6637; B60N 2/62; B60N 2002/026; B60N 2/6673
See application file for complete search history.

(56) References Cited

U.S. PATENT DOCUMENTS

| 5,088,790 | A  | * | 2/1992 | Wainwright | ........... B60N 2/666 297/284.4 |
| 7,488,039 | B2 | * | 2/2009 | Fischer    | ................ B60N 2/0232 297/284.4 |
| 8,091,967 | B2 | * | 1/2012 | Schweizer  | ........... B60N 2/6671 297/284.7 |

(Continued)

FOREIGN PATENT DOCUMENTS

| DE | 102007003642 A1 * | 7/2008 | ............... B60N 2/66 |
| DE | 102008047243 A1 * | 3/2010 | ........... B60N 2/0232 |

(Continued)

OTHER PUBLICATIONS

European Search Report, EP Application No. 21169851.9 dated Jul. 19, 2021.

(Continued)

*Primary Examiner* — Timothy J Brindley
(74) *Attorney, Agent, or Firm* — The Dobrusin Law Firm, P.C.

(57) ABSTRACT

Proposed is a support driver for a seat and a support assembly including the same. The support driver is configured to operate within a limited space while supporting an occupant comfortably and safely. The support assembly has a structure in which the links push the central portion of the cushion in close contact therewith while remaining in intersection with each other. Advantageously, the links are able to push the cushion with a minimum amount of power within a limited space.

6 Claims, 7 Drawing Sheets

(56) References Cited

U.S. PATENT DOCUMENTS

| | | | | |
|---|---|---|---|---|
| 2009/0091169 | A1* | 4/2009 | Neumann | B60N 2/6671 |
| | | | | 297/284.4 |
| 2014/0125102 | A1 | 5/2014 | McMillen et al. | |
| 2016/0250957 | A1* | 9/2016 | Yoo | B60N 2/666 |
| | | | | 297/284.7 |
| 2020/0254911 | A1* | 8/2020 | Line | B60N 2/62 |

FOREIGN PATENT DOCUMENTS

| | | | | | |
|---|---|---|---|---|---|
| DE | 102008047249 | A1 | | 3/2010 | |
| DE | 102010039353 | A1 | * | 2/2012 | ........... B60N 2/0232 |
| DE | 102011075514 | A1 | * | 11/2012 | .............. B60N 2/66 |
| JP | 2008526607 | A | * | 7/2008 | |
| JP | 2016-196283 | A | | 11/2016 | |
| JP | 2016-222240 | A1 | | 12/2016 | |
| JP | 2019-131049 | A | | 8/2019 | |
| KR | 10-0805475 | A | | 2/2008 | |
| KR | 10-1006730 | A | | 1/2011 | |
| KR | 10-1388983 | B1 | | 4/2014 | |
| WO | WO-2006076898 | A2 | * | 7/2006 | ........... B60N 2/0232 |
| WO | WO-2018060219 | A1 | * | 4/2018 | .............. B60N 2/66 |

OTHER PUBLICATIONS

India First Examination Report, IN Application No. 202114019564 dated Oct. 11, 2022.
Japanese Office Action, JP Application No. 2021-077681 dated Jun. 8, 2022.
Korean Office Action, KR Application No. 10-2017-005142 dated Oct. 26, 2022.

* cited by examiner

US 11,673,491 B2

SUPPORT DRIVER FOR SEAT AND SUPPORT ASSEMBLY INCLUDING SAME

CLAIM OF PRIORITY

The present application claims priority to Korean Patent Application No. 10-2021-0043545, filed Apr. 2, 2021, the entire contents of which are incorporated herein for all purposes by this reference.

FIELD OF THE INVENTION

The present disclosure relates generally to a support driver for a seat and a support assembly including the same and, more particularly, to a support driver for a seat, the support driver being coupled to a seat frame of a vehicle to support an occupant, and a support assembly including the same.

BACKGROUND OF THE INVENTION

Description of the Related Art

Unless otherwise described herein, any information disclosed in this section does not form a prior art of the Claims of this application and any information described in this section should not be taken as a prior art.

A seat may be provided with a seat cushion supporting the buttocks of an occupant, a seatback supporting the back of the occupant, armrests on which the arms of the occupant may be supported, and a headrest supporting the head of the occupant. The seat may be adjusted to any shape suitable to the occupant under the control of the occupant.

Products having a variety of structures have been fabricated or researched for a seat support device supporting the surroundings of the pelvis of the occupant. For the purpose of improvements in the performance and the fuel efficiency of vehicles, the seat support device needs to be fabricated having as few a number of components as possible in order to reduce the weight thereof.

In addition, for the seat support device to be disposed within seats having a variety of sizes applied to a variety of types of vehicles, a structure that supports the body of the occupant comfortably and reliably while being deformable in a limited space is essentially required.

In this regard, Korean Patent No. 10-1006730 discloses a lumbar support device, and Korean Patent No. 10-0805475 discloses a support device for a vehicle seat.

However, none of the existing documents discloses an invention that may minimize the weight of a support assembly by reducing the number of components of the support assembly while being able to operate within a limited space.

Documents of Related Art (Patent Document 1) Korean Patent No. 10-1006730
(Patent Document 2) Korean Patent No. 10-0805475

SUMMARY OF THE INVENTION

Accordingly, the present disclosure has been made keeping in mind the above problems occurring in the related art, and the present disclosure is intended to propose a support driver for a seat, the support driver being able to operate within a limited space while supporting an occupant comfortably and safely, and a support assembly including the same.

The object of the present disclosure is not limited to the aforementioned description, and other objects not explicitly disclosed herein will be clearly understood by those skilled in the art to which the present disclosure pertains from the description provided hereinafter.

In order to achieve the above objective, according to an embodiment of the present disclosure, there is provided a support driver supporting a cushion pivotably coupled to a seat frame. The support driver may include: a lead screw disposed at the rear of the cushion, connected to a drive shaft of a motor, and including threads provided on one side and the other side to extend in opposite directions; nuts screw-coupled to one side and the other side of the lead screw, with a rear surface thereof being coupled to the seat frame so as to be movable to one side or the other side; a support block coupled to the seat frame on a central portion of the lead screw and protruding more forward than the nuts; and links each including one end coupled to a corresponding nut of the nuts so as to be pivotable about a shaft extending in a top-bottom direction and the other end extending from one end toward the support block, the other ends extending toward and intersecting each other to be disposed between the cushion and the support block. The nuts may be moved toward the support block following forward pivoting of the lead screw in response to an operation of the motor, and the other ends of the links push the cushion.

Each of the links may extend toward the support block while being repeated in a zigzag pattern in a forward direction or a backward direction.

The support driver may further include a bracket-shaped support bracket extending toward one side or the other side from a position at the rear of the support bracket and coupled to the seat frame.

The support block may include guides protruding forward from positions spaced apart the same distance from an upper portion or a lower portion, the guides being alternating with the links.

according to an embodiment of the present disclosure, there is provided a support assembly including: a first cushion pivotably coupled to a back frame of a seat frame; a first support driver including a lead screw configured to pivot in response to an operation of a motor, a support block coupled to the lead screw, nuts coupled to the lead screw on one side and the other side of the support block, and links each including one end coupled to a corresponding nut of the nuts so as to be pivotable about a shaft extending in a top-bottom direction, the other ends of the links intersecting each other between the first cushion and the support block; a second cushion pivotably coupled to a bottom frame of the seat frame; and a second support driver disposed on a lower portion of or below the second cushion and configured such that a portion thereof is moved upward to push the second cushion upward or is moved downward in response to an operation of a lower motor. Threads may be provided on one side and the other side of the lead screw to extend in opposite directions, and rear surfaces of the nuts are coupled to the seat frame to slide to both sides through a bracket.

Each of the links may extend toward the support block while being repeated in a zigzag pattern in a forward direction or a backward direction.

The first support driver may further include a bracket-shaped support bracket extending toward one side or the other side from a position at the rear of the support bracket and coupled to the seat frame.

The support block may include guides protruding forward from positions spaced apart the same distance from an upper portion or a lower portion, the guides being alternating with the links.

According to an embodiment of the present disclosure, the support assembly has a structure in which the links push the central portion of the cushion in close contact therewith while remaining in intersection with each other. Advantageously, the cushion may be pushed with a minimum amount of power within a limited space.

In addition, according to an embodiment, the support assembly may support the body of the occupant at a variety of positions by using the support drivers having the same shape. Unlike the conventional technology, the links may reliably support the cushion while moving toward the central portion of the cushion to which the weight of the occupant is concentrated and pushing the cushion, thereby preventing the cushion from being deformed.

Furthermore, according to an embodiment, the support assembly is configured such that the links are in close contact with the central portion of the cushion while remaining folded in the support bracket without pushing the cushion and reliably support the cushion together with the support block. Thus, unlike the conventional technology, even when the links are folded, the cushion may be advantageously prevented from being deformed.

In addition, the effects of the present disclosure as described above are obtained properly according to the contents described herein irrespective of whether or the inventors recognize the effects. Thus, the above-described effects are only some effects according to the contents described, and it should be construed that other effects are possible.

In addition, the effects of the present disclosure should be determined additionally on the basis of the complete description of the specification. Although not explicitly described, any effects that may be recognized by those skilled in the art to which the present disclosure relates, on the basis of the description of the specification, shall be regarded as the effects described herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
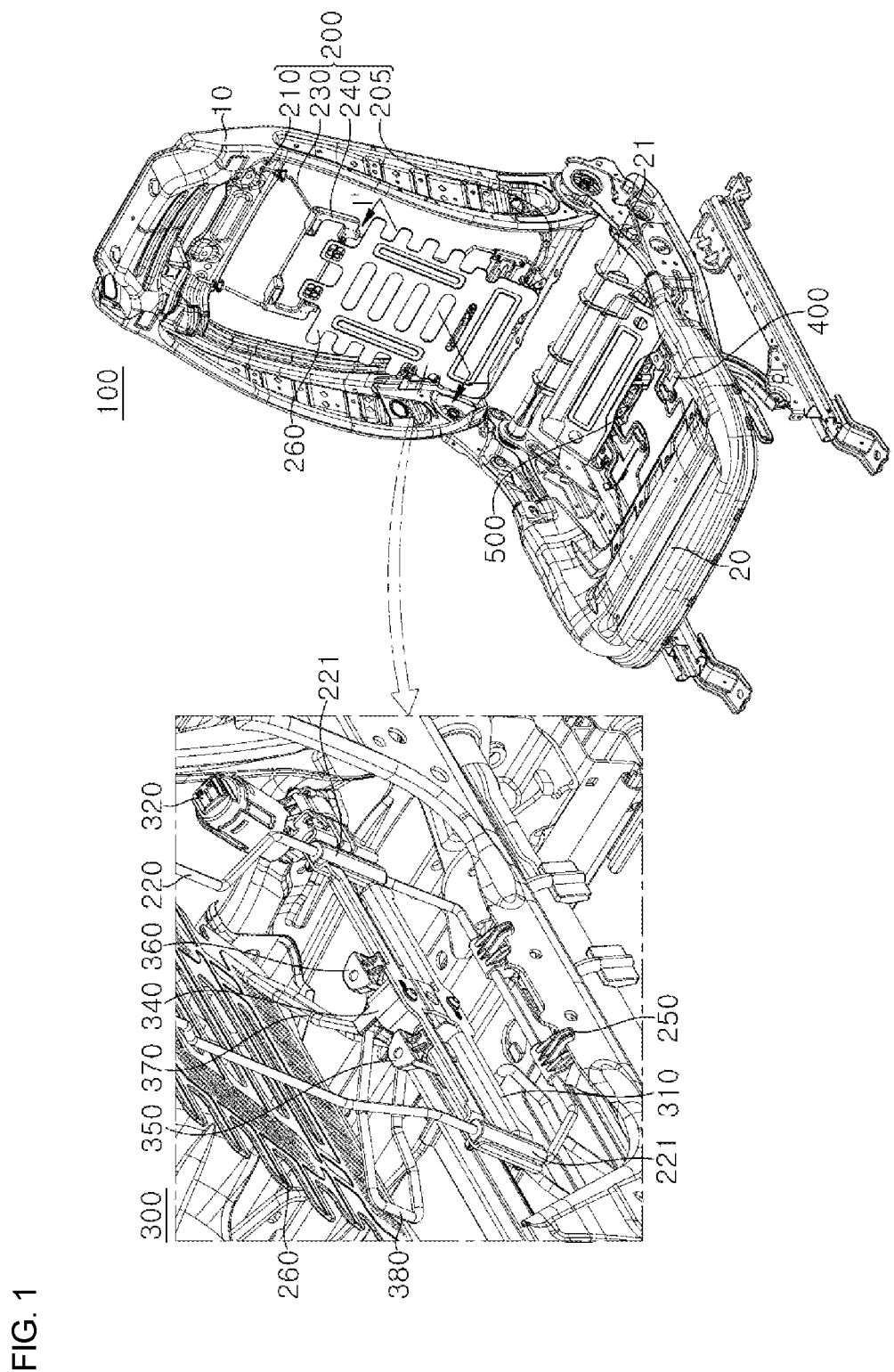
FIG. 1 is a view illustrating a usage of a support assembly according to an embodiment of the present disclosure.

Hereinafter, a support driver for a seat and a support assembly including the same according to exemplary embodiments will be described, in relation to configurations, operations, and effects thereof, with reference to the drawings. For reference, in the drawings, components are omitted or schematically illustrated for the sake of convenience and clarity, and the size of each component may not reflect the actual size. Throughout this document, the same reference numerals and symbols will be used to designate the same or like components. In individual drawings, reference numerals of the same components will be omitted.

As illustrated in FIGS. 1 to 7, a support assembly 100 includes an upper support 200, a first support driver 300, a lower support 400, and a second support driver 500.

The support assembly 100 is coupled to a seat frame comprised of a seatback frame 10 and a seat cushion frame 20, and is deformed by being operated by the occupant to comfortably support the pelvis of the occupant seated on a seat.

Specifically, the upper support 200 includes a lower bracket 205, an upper bracket 210, a first support member 220, a second support member 230, a first bracket 240, a pivot member 250, and a first cushion 260.

The upper support 200 is configured such that one end thereof connects both sides of the lower portion of the seatback frame 10 and the other end thereof extends upward to be coupled to both sides of the upper portion of the seatback frame 10.

The lower bracket 205 is provided in the shape of a bracket extending to one or the other side, with one side and the other side thereof being coupled to one side and the other side of the seatback frame 10 and being coupled to the first support member 220 through the pivot member 250.

The upper bracket 210 is provided in the shape of a bracket provided on from the upper portion of the seatback frame 10 and extending toward one or the other side, with one side and the other side thereof being coupled to one side and the other side of the seatback frame 10.

Portions of one side and the other side of the first support member 220 are bent perpendicularly upward to be coupled to the first bracket 240, and the lower portion of the first support member 220 is coupled to the lower bracket 205 through the pivot member 250 so as to be pivotable.

Portions of one side and the other side of the second support member 230 are bent perpendicularly upward to be coupled to the upper bracket 210, and the lower portion of the second support member 230 is coupled to the first bracket 240 while remaining inserted in the first bracket 240.

The first bracket 240 is provided in the shape of a rectangular frame with an internal space thereof being open downward. A portion of the lower periphery of the second support member 230 is exposed to the lower portion of the first bracket 240 while remaining coupled to the first bracket 240.

One end of the first cushion 260 is provided in the shape of a plate that is coupled to a portion of the lower periphery of the second support member 230 so as to be pivotable about a shaft extending to one or the other side.

The other end of the first cushion 260 extends downward by a predetermined distance from one end to support the buttocks, the back, and the like of the occupant, and is configured to move forward or backward in response to the operation of the first support driver 300.

The first support driver 300 includes a first support bracket 310, a first motor 320, first lead screws 330 and 335, a connecting socket 338, a support block 340, first nuts 350 and 360, and first links 370 and 380.

At a position in front of the first support member 220, the first support driver 300 is detachably coupled to the first support member 220 through coupling members 221. The first links 370 and 380 are moved forward or backward in response to the operation of the first motor 320.

The first support bracket 310 includes a frame 311 and rails 312, 313, 314, and 315.

The first support bracket 310 is provided in the shape of a vertical plate extending toward one or the other side, with the surface thereof being directed forward and backward. One side and the other side of the first support bracket 310 are coupled to portions of one side and the other side of the first support member 220, respectively.

Specifically, the frame 311 is provided in the shape of a vertical plate extending toward one or the other side, with the surface thereof being directed forward and backward, and through-holes 310a and 310b being formed in one side and the other side so as to extend through the frame 311.

The through-hole 310a is formed by backwardly depressing a portion of the rectangular front surface located on one side of the frame 311 and extending to both sides.

The through-hole 310b is formed by backwardly depressing a portion of the rectangular front surface located on the other side of the frame 311 and extending to both sides One end of the rail 312 is formed by forwardly extending the inner surface of the frame 311, corresponding to the lower portion of the through-hole 310a, into the shape of a plate, and the other end of the rail 312 is perpendicularly bent upward from one end to be perpendicular to one end.

One end of the rail 313 is formed by forwardly extending the inner surface of the frame 311, corresponding to the upper portion of the through-hole 310a, into the shape of a plate, and the other end of the rail 313 is perpendicularly bent downward from one end while being spaced apart from the other end of the rail 312.

One end of the rail 314 is formed by forwardly extending the inner surface of the frame 311, corresponding to the lower portion of the through-hole 310b, into the shape of a plate, and the other end of the rail 314 is bent upward from one end.

One end of the rail 315 is formed by forwardly extending the inner surface of the frame 311, corresponding to the upper portion of the through-hole 310b, into the shape of a plate, and the other end of the rail 315 is perpendicularly bent downward from one end while being spaced apart from the other end of the rail 314.

The first motor 320 is coupled to the other side of the first support bracket 310, and the drive shaft of the first motor 320 extends toward one side to be coupled to the first lead screw 335 in the through-hole 310b.

The first lead screw 330 extends toward one or the other side between the other ends of the rails 312 and 313, with a portion of the other end thereof being connected to the first lead screw 330 through the connecting socket 338.

The first lead screw 335 extends toward one or the other side between the other ends of the rails 314 and 315, with a portion of one end thereof being connected to the first lead screw 330 through the connecting socket 338.

A thread formed on the outer portion of the first lead screw 330 and a thread formed on the outer portion of the first lead screw 335 are formed in the opposite directions. Each of the first nuts 350 and 360 screw-coupled to the first lead screws 330 and 335, respectively, is moved to the connecting socket 338 in response to forward pivoting of the first lead screws 330 and 335.

The first lead screws 330 and 335 may be integrally fabricated such that the first lead screws 330 and 335 are connected to each other. Threads formed on one side and the other side of the integral lead screws extend in the opposite directions.

The connecting socket 338 is provided in the shape of a cylinder, with a portion of one side thereof being coupled to a portion of the other side of the first lead screw 330, and a portion of the other side thereof being coupled to a portion of one side of the first lead screw 335.

Thus, when the drive shaft rotates forward or backward due to the operation of the first motor 320, the first lead screws 330 and 335 are rotated forward or backward through the drive shaft and the connecting socket 338.

The support block 340 is provided in the shape of a hexahedral structure, with an arch-shaped through-recess 340a being formed in the central portion of the rear portion thereof. With the connecting socket 338 being inserted into the through-recess 340a, the rear surface of the support block 340 located above and below the through-recess 340a is coupled to the front surface of the first support bracket 310.

The support block 340 includes a support body 341, a lower guide 342, an upper guide 343, and pivot guides 344, 345, 346, and 347.

The support body 341 is provided in the shape of a hexahedral structure, with a through-recess 340a being formed in the rear portion thereof. The rear surface of the support body 341 is detachably coupled to the front surface of the frame 311 located between the through-holes 310a and 310b such that the rear surface of the support body 341.

One end of the lower guide 342 is connected to the front surface located at the distal end of the lower portion of the support body 341, and the other end of the lower guide 342 extends forward at a predetermined distance from one end of the lower guide 342 to surround a portion of the first link 370 together with the pivot guide 344.

One end of the pivot guide 344 is connected to the front surface of the support body 341 at a position spaced apart a predetermined distance from the upper portion of the lower guide 342, and the other end of the pivot guide 344 extends forward to a position on the same vertical line as the other end of the lower guide 342.

One end of the pivot guide 345 is connected to the front surface of the support body 341 at a position spaced apart a predetermined distance from the upper portion of the pivot guide 344, and the other end of the pivot guide 345 extends forward to a position on the same vertical line as the other end of the pivot guide 344.

One end of the pivot guide 346 is connected to the front surface of the support body 341 at a position spaced apart a predetermined distance from the upper portion of the pivot guide 345, and the other end of the pivot guide 346 extends forward to a position on the same vertical line as the other end of the pivot guide 345.

One end of the pivot guide 347 is connected to the front surface of the support body 341 at a position spaced apart a predetermined distance from the upper portion of the pivot guide 346, and the other end of the pivot guide 347 extends forward to a position on the same vertical line as the other end of the pivot guide 346.

A slot recess into which a portion of the first link 380 is inserted is formed between the pivot guide 346 and the upper guide 343. During the movement of the first link 380, the pivot guide 346 and the upper guide 343 guide a direction in which the first link 380 moves.

The first nut 350 includes a nut body 351, sliders 352a and 352b, and guides 353 and 354. The first nut 360 includes a nut body 361, sliders 362a and 362b, and guides 363 and 364.

One end of the first nut 350 is provided in the shape of a cylinder extending to one or the other side and is screw-coupled to the first lead screw 330 at a position corresponding to one side of the support block 340, and the other end of the first nut 350 is provided in the shape of a rectangular plate in front of one end of the first nut 350.

One end of the first nut 360 is provided in the shape of a cylinder extending to one or the other side and is screw-coupled to the first lead screw 335 at a position corresponding to the other side of the support block 340, and the other end of the first nut 360 is provided in the shape of a rectangular plate in front of one end of the first nut 360.

One end of the nut body 351 is provided in the shape of a cylinder surrounding the first lead screw 330, and the other end of the nut body 351 is provided in the shape of a bracket, with portions of upper and lower portions thereof protruding forward at positions in front of one end of the nut body 351.

The sliders 352a and 352b are respectively provided in the shape of a vertical plate extending upward or downward, and extend toward the upper and lower portions of one end of the nut body 351 from above and below one end of the nut body 351, respectively.

One end of the guide 353 is connected to the rear surface of the nut body 351 located between the bottom surface of the nut body 351 and the slider 352a, and the other end of the guide 353 is provided in the shape of a horizontal plate parallel to the ground and extends backward a predetermined distance.

One end of the guide 354 is connected to the rear surface of the nut body 351 located between the bottom surface of the nut body 351 and the slider 352b, the other end of the guide 354 is provided in the shape of a horizontal plate parallel to the ground and extends backward a predetermined distance.

A spacer 355 is provided in the shape of a hexahedral structure, at a position of the other end of the nut body 351 adjacent to the support block 340. The spacer 355 is configured to prevent the first link 370 pivotably coupled to the nut body 351 from being dislodged from the nut body 351.

One end of the nut body 361 is provided in the shape of a cylinder surrounding the first lead screw 335, and the other end of the nut body 361 is provided in the shape of a bracket, with portions of upper and lower portions thereof protruding forward at positions in front of one end of the nut body 361.

The sliders 362a and 362b are respectively provided in the shape of a vertical plate extending upward or downward, and extend toward the upper and lower portions of one end of the nut body 361 from above and below one end of the nut body 361, respectively.

One end of the guide 363 is connected to the rear surface of the nut body 361 located between the bottom surface of the nut body 361 and the slider 362a, and the other end of the guide 363 is provided in the shape of a horizontal plate parallel to the ground and extends backward a predetermined distance.

One end of the guide 364 is connected to the rear surface of the nut body 361 located between the bottom surface of the nut body 361 and the slider 362b, the other end of the guide 364 is provided in the shape of a horizontal plate parallel to the ground and extends backward a predetermined distance.

A spacer 365 is provided in the shape of a hexahedral structure, at a position of the other end of the nut body 361 adjacent to the support block 340. The spacer 365 is configured to prevent the first link 370 pivotably coupled to the nut body 361 from being dislodged from the nut body 361.

Figure 4:
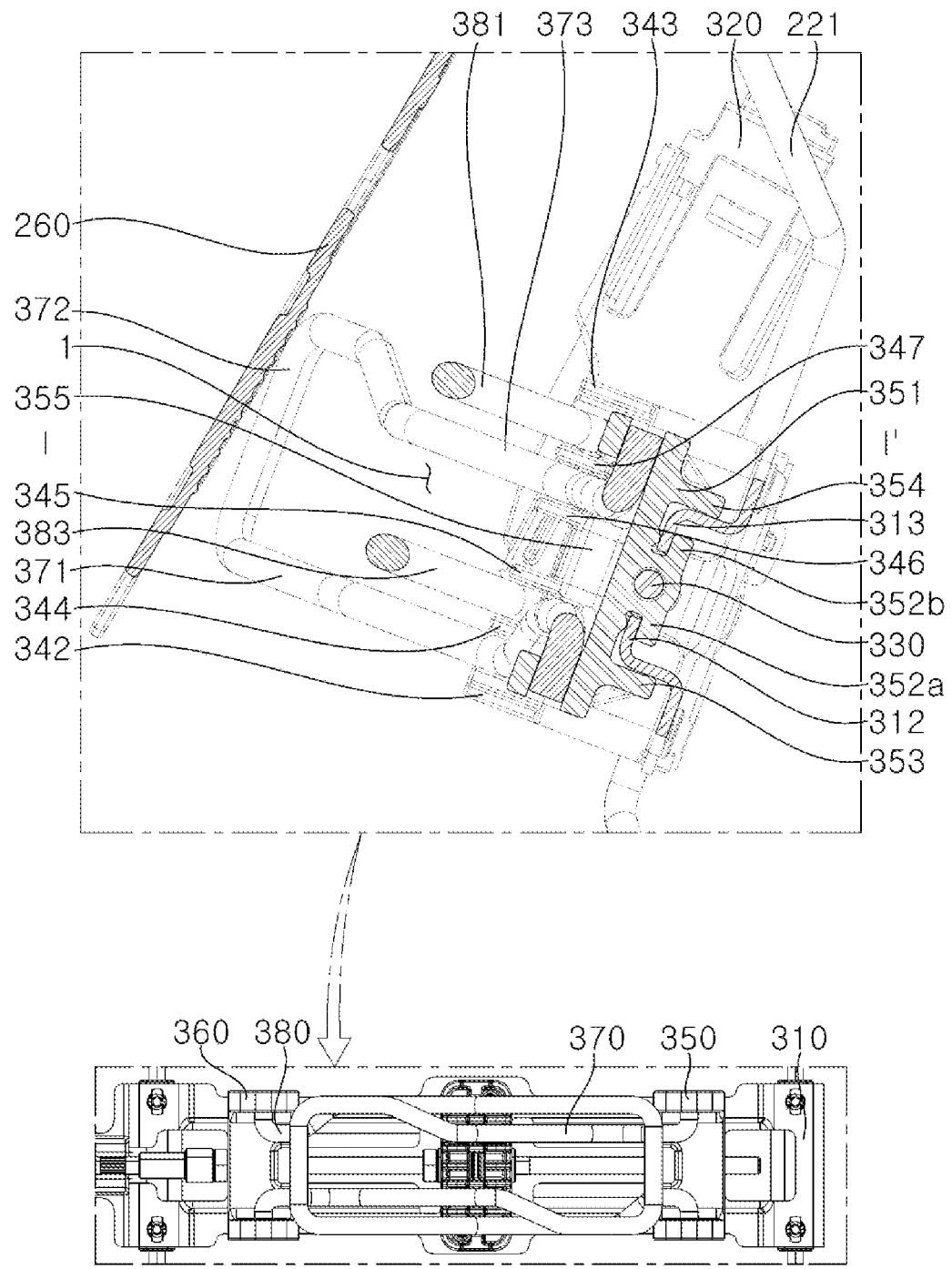
FIG. 4 is a cross-sectional view taken along the line I-I' in FIG. 1.

As illustrated in FIG. 4, the other end of the rail 312 is inserted between the slider 352a and the rear surface of the nut body 351, and one end of the rail 312 is inserted between the slider 352a and the guide 353.

The other end of the rail 313 is inserted between the slider 352b and the rear surface of the nut body 351, and one end of the rail 313 is inserted between the guide 354 and the slider 352b.

The rails 314 and 315 are also coupled to the first nut 360 in the same arrangement as the rails 312 and 313. The first nut 360 coupled to the rails 314 and 315 is moved to slide to one or the other side on the rails 314 and 315 in response to the pivoting of the first lead screw 335.

The first nut 350 coupled to the rails 312 and 313 moves toward the connecting socket 338 on the rails 312 and 313 in response to forward pivoting of the drive shaft and the first lead screw 330.

The first nut 360 coupled to the rails 314 and 315 moves toward the connecting socket 338 on the rails 314 and 315 in response to forward pivoting of the drive shaft and the first lead screw 335.

The first link 370 includes an outer member 371, a pressing member 372, and an inner member 373. The first link 380 includes an outer member 381, a pressing member 382, and an inner member 383.

One end of the first link 370 is pivotably coupled to the first nut 350 about an upwardly or downwardly extending shaft, and the other end of the first link 370 obliquely extends toward the other side or the front, and is in close contact with the rear surface of the first cushion 260.

One end of the first link 380 is pivotably coupled to the first nut 360 about an upwardly or downwardly extending shaft, and the other end of the first link 380 obliquely extends toward the other side or the front while intersecting the first link 370 and is in close contact with the rear surface of the first cushion 260.

In addition, the first links 370 and 380 may respectively be provided in the shape of a plate extending to one or the other side instead of the link shape illustrated in the figures, and may be in close contact with the first cushion 260 while intersecting each other.

Figure 2:
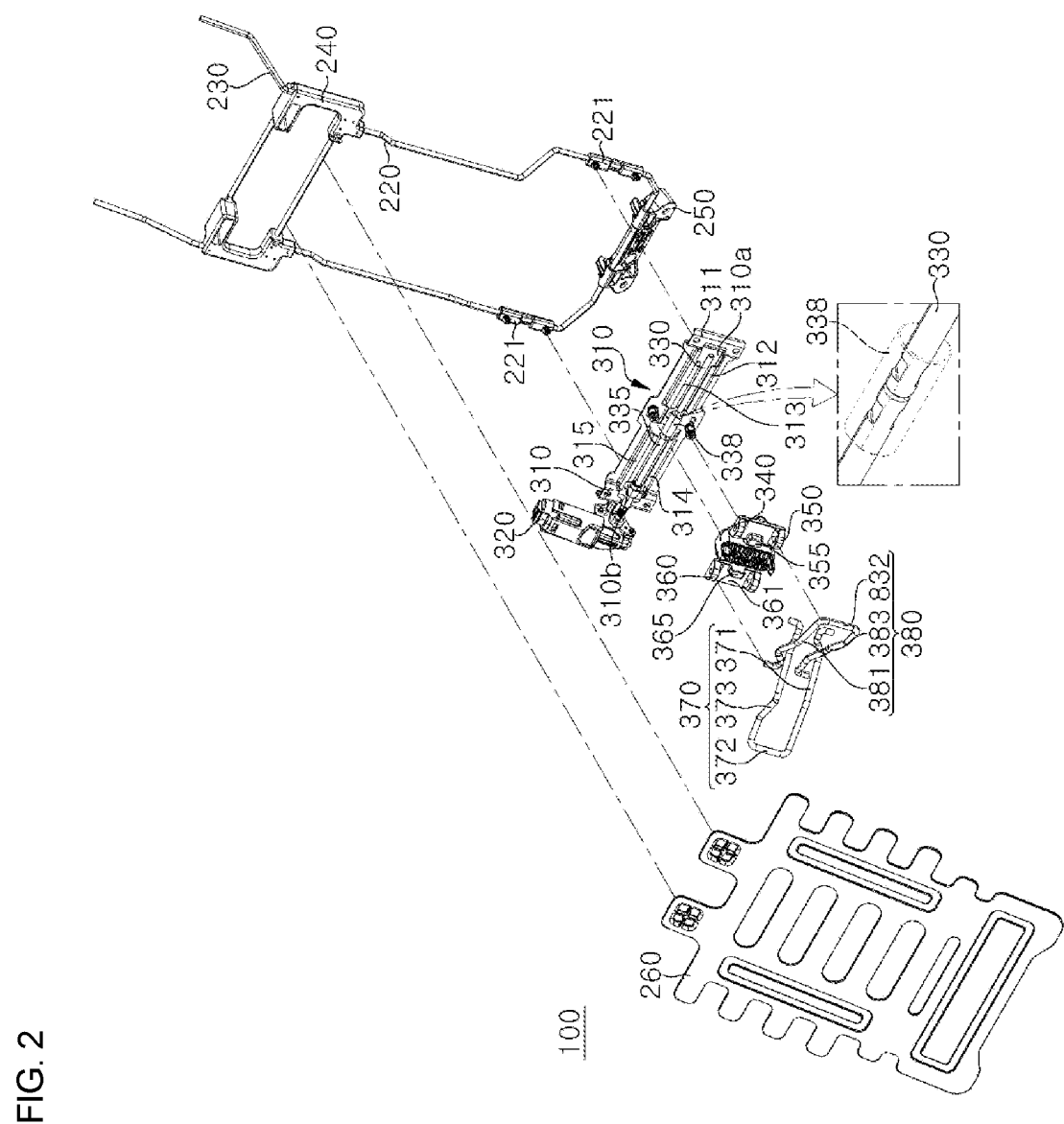
FIGS. 2 and 3 are exploded perspective views of the support assembly illustrated in FIG. 1.
Figure 3:
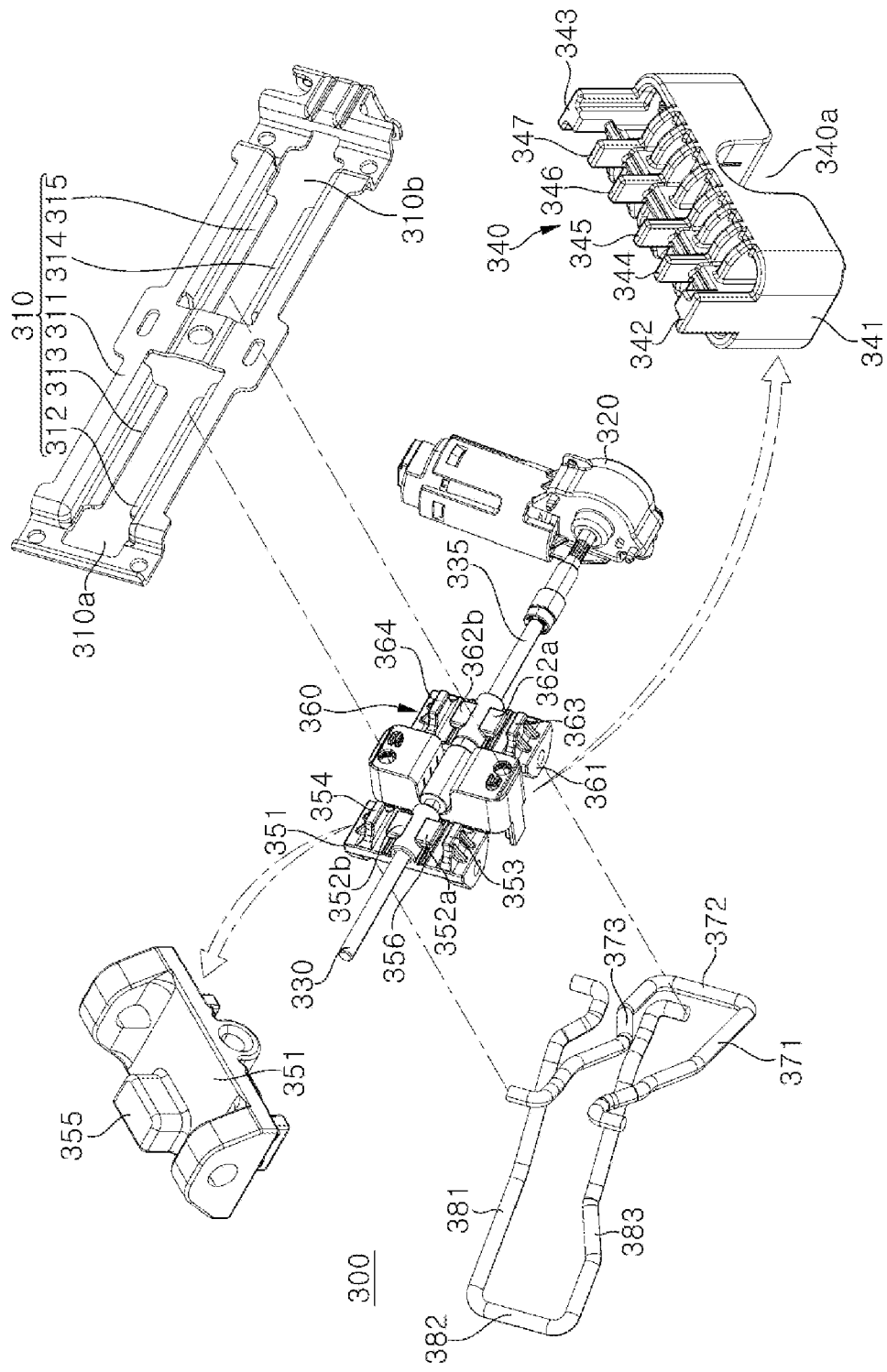

As illustrated in FIGS. 2 and 3, one end of the outer member 371 is provided in the shape of a ring and is pivotably coupled to the lower portion of the other end of the first nut body 351 about an upwardly or downwardly extending shaft.

The central portion of the outer member 371 is bent forward at a predetermined angle from one end of the outer member 371. The central portion of the outer member 371 has the shape of a stick obliquely extending a predetermined distance toward the other side or the front and is disposed in front of the support block 340.

The other end of the outer member 371 is bent backward at a predetermined angle from one end of the outer member 371, obliquely extends a predetermined distance toward the other side or the front, and is disposed at the rear of the first cushion 260.

One end of the pressing member 372 is provided in the shape of a stick connected to the other end of the outer member 371, and the other end of the pressing member 372 extends upward a predetermined distance from one end of the pressing member 372 to be perpendicular to the outer member 371 and is in close contact with the rear surface of the first cushion 260.

One end of the inner member 373 is provided in the shape of a stick connected to the other end of the pressing member 372 and extends a predetermined distance toward one side while remaining parallel to the other end of the outer member 371.

The central portion of the inner member 373 obliquely extends a predetermined distance toward the outer member 371 and the lower portion from one end of the inner member 373, is bent toward one side and the rear, and then extends a predetermined distance toward the support block 340 so as to be inserted between the pivot guides 346 and 347.

The other end of the inner member 373 is bent forward at a predetermined angle from the central portion of the inner member 373, extends toward the first nut 350 to be parallel to the outer member 371, and is pivotably coupled to the upper portion of the other end of the first nut body 351.

As illustrated in FIG. 4, the central portion of the outer member 371 extends toward the other side and the front through between the lower guide 342 and the pivot guide 344, with one end of the outer member 371 remaining coupled to the first nut body 351.

Thus, during forward or backward movement of the pressing member 372, the lower guide 342 and the pivot guide 344 reliably guide the movement of the outer member 371. During forward or backward movement of the pressing member 372, the pivot guides 346 and 347 reliably guide the movement of the inner member 373.

As illustrated in FIGS. 2 and 3, one end of the outer member 381 is provided in the shape of a ring and is coupled to the upper portion of the other end of the first nut body 361 so as to be pivotable about an upwardly or downwardly extending shaft.

The central portion of the outer member 381 is bent forward at a predetermined angle from one end of the outer member 381 and extends a predetermined distance toward one side or the front to be inserted between the pivot guide 347 and the upper guide 343 at positions in front of the support block 340.

The other end of the outer member 381 is bent backward at a predetermined angle from the central portion of the outer member 381, obliquely extends a predetermined distance toward one side and the front, and is disposed at the rear of one side of the first cushion 260.

A portion of one end of the pressing member 382 is provided in the shape of a stick connected to the other end of the outer member 381, and the other end of the pressing member 382 downwardly extends from one end of the pressing member 382 by a predetermined distance to be parallel to the outer member 381 and is in close contact with the rear surface of the first cushion 260.

The pressing member 382 is disposed to face the pressing member 372 on the same horizontal surface as the pressing member 372, with the support block 340 being located between the pressing member 382 and the pressing member 372.

One end of the inner member 383 is provided in the shape of a stick connected to the other end of the pressing member 382 and extends a predetermined distance toward the other side while remaining parallel to the other end of the outer member 381.

The central portion of the inner member 383 obliquely extends a predetermined distance toward the outer member 381 and the upper portion from one end of the inner member 383, is bent toward the other side and the rear, and then extends a predetermined distance toward the support block 340 so as to be inserted between the pivot guides 344 and 345.

The other end of the inner member 383 is bent forward at a predetermined angle from the central portion of the inner member 383, extends toward the first nut 350 to be parallel to the outer member 381, and is pivotably coupled to the lower portion of the other end of the first nut body 361.

The other end of the inner member 383 extends toward the first nut body 361 while intersecting the outer member 371 at a position corresponding to the upper portion of the outer member 371 and is pivotably coupled to the lower portion of the first nut body 361.

As illustrated in FIG. 4, one end of the outer member 381 extends toward one side and the front through between the upper guide 343 and the pivot guide 347 while remaining coupled to the first nut body 361.

The other end of the inner member 383 extends toward the other side and the rear through between the pivot guide 344 and 345 and is pivotably coupled to the lower portion of the first nut body 361.

Thus, during forward or backward movement of the pressing member 382, the upper guide 343 and the pivot guide 347 reliably guide the movement of the outer member 381. During forward or backward movement of the pressing member 382, the pivot guides 344 and 345 reliably guide the movement of the inner member 383.

Figure 5:
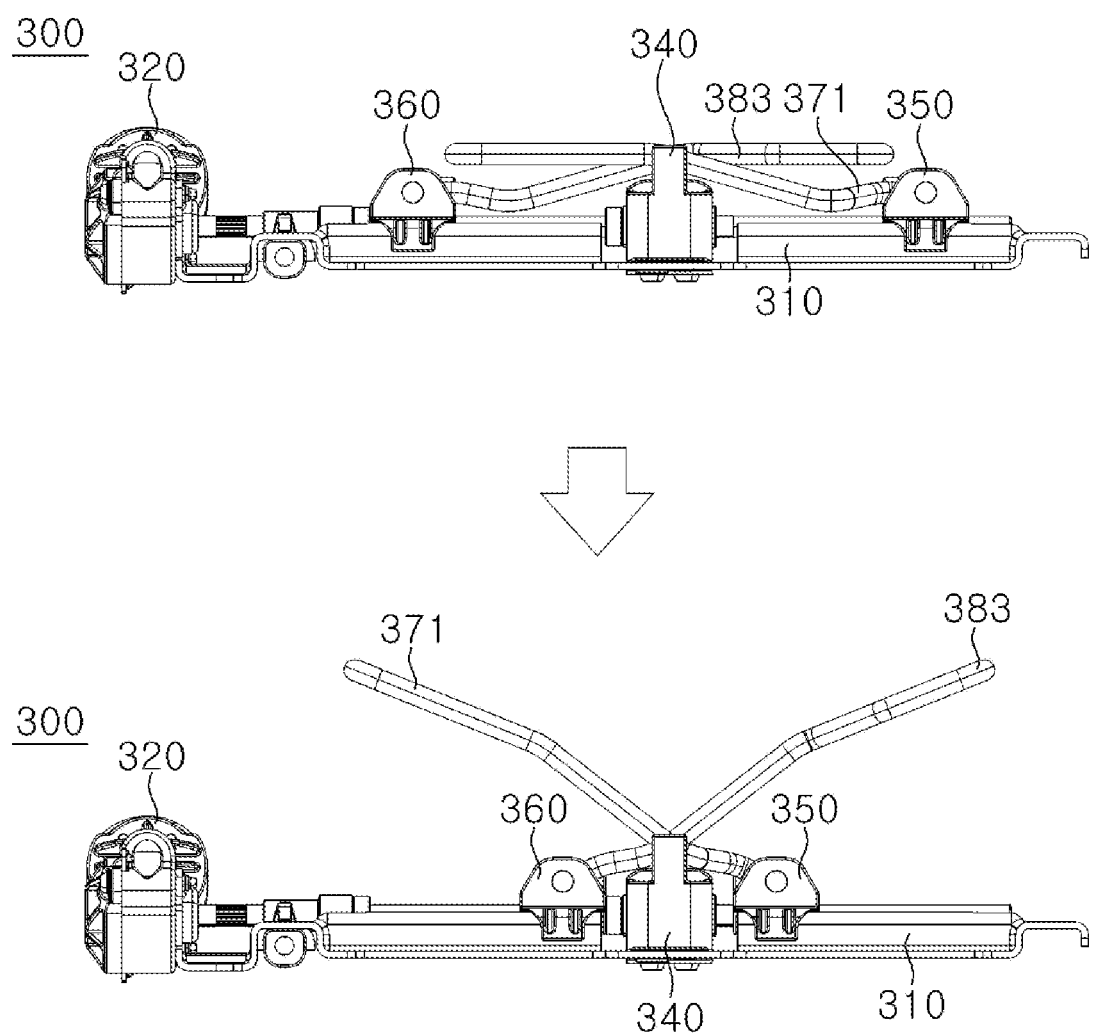
FIG. 5 is a schematic view illustrating the operation of the first or second support driver illustrated in FIG. 1.

As illustrated in FIG. 5, in response to the drive shaft of the first motor 320 being rotated backward, the first lead screws 330 and 335 are rotated backward, and the first and second nuts 350 and 360 are moved toward one side and the other side, respectively, with the support block 340 being located therebetween.

In a position in which the first and second nuts 350 and 360 have been moved toward one side and the other side of the first support bracket 310, respectively, the other end of the outer member 371, the pressing member 372, one end of the inner member 373, and a portion of the central portion of the inner member 373 are disposed parallel to the rear surface of the first support bracket 310.

In a position in which the first and second nuts 350 and 360 have been moved toward one side and the other side of the first support bracket 310, respectively, the other end of the outer member 381, the pressing member 382, one end of the inner member 383, and a portion of the central portion of the inner member 383 are disposed parallel to the rear surface of the first support bracket 310.

Thus, in a position in which the first and second nuts 350 and 360 have been moved toward one side and the other side of the first support bracket 310, the rear surface of the first cushion 260 is in close contact with the other end of the outer member 371, the pressing member 372, one end of the inner member 373, the central portion of the inner member 373, the other end of the outer member 381, the pressing member 382, one end of the inner member 383, and the central portion of the inner member 383, thereby reliably supporting the occupant.

In addition, when external force applied to a vehicle is applied to the first cushion 260, the other end of the outer member 371, the pressing member 372, one end of the inner member 373, the central portion of the inner member 373, the other end of the outer member 381, the pressing member 382, one end of the inner member 383, and the central portion of the inner member 383 are supported by the support block 340 while remaining in close contact with the first cushion 260. Thus, the durability of the first links 370 and 380 is advantageously increased.

In contrast, when the drive shaft of the first motor 320 is rotated forward, the first lead screws 330 and 335 are rotated forward, and the first and second nuts 350 and 360 are moved toward the support block 340, respectively.

Here, the other ends of the outer members 371 and 381, the pressing members 372 and 382, and one ends and the central portions of the inner members 373 and 383 are moved forward, and the other end of the first cushion 260 is moved forward by the pressing members 372 and 382.

Thus, the first and second 370 and 380 disposed to intersect each other are moved forward or backward along the movement of the first nuts 350 and 360. Since the first and second 370 and 380 are disposed to extend toward and intersect each other, there are advantages in that the first and second 370 and 380 move the position of the first cushion 260 while being deformed in a minimum space.

Figure 6:
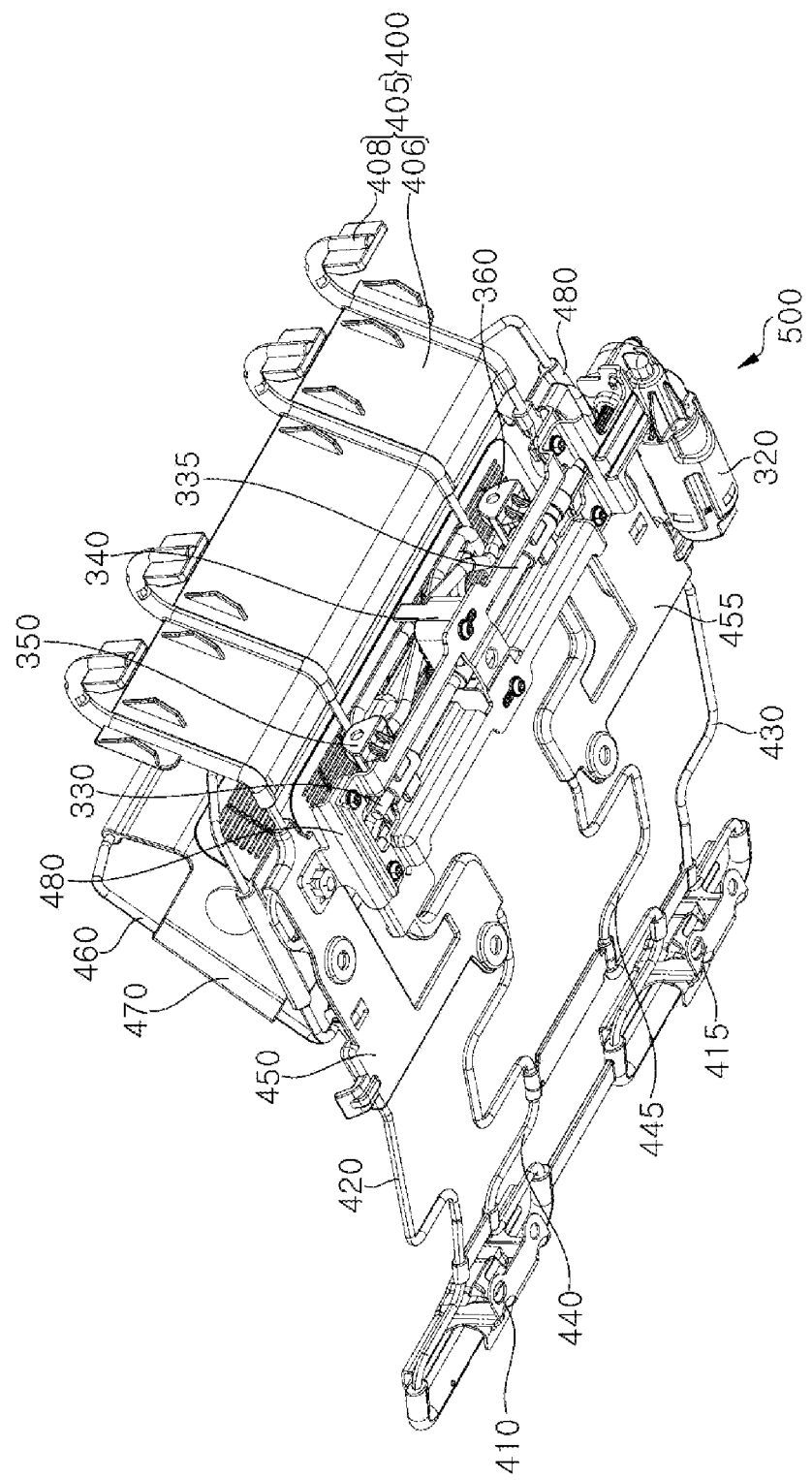
FIG. 6 is a perspective view of the first bracket and the second bracket illustrated in FIG. 1.
Figure 7:
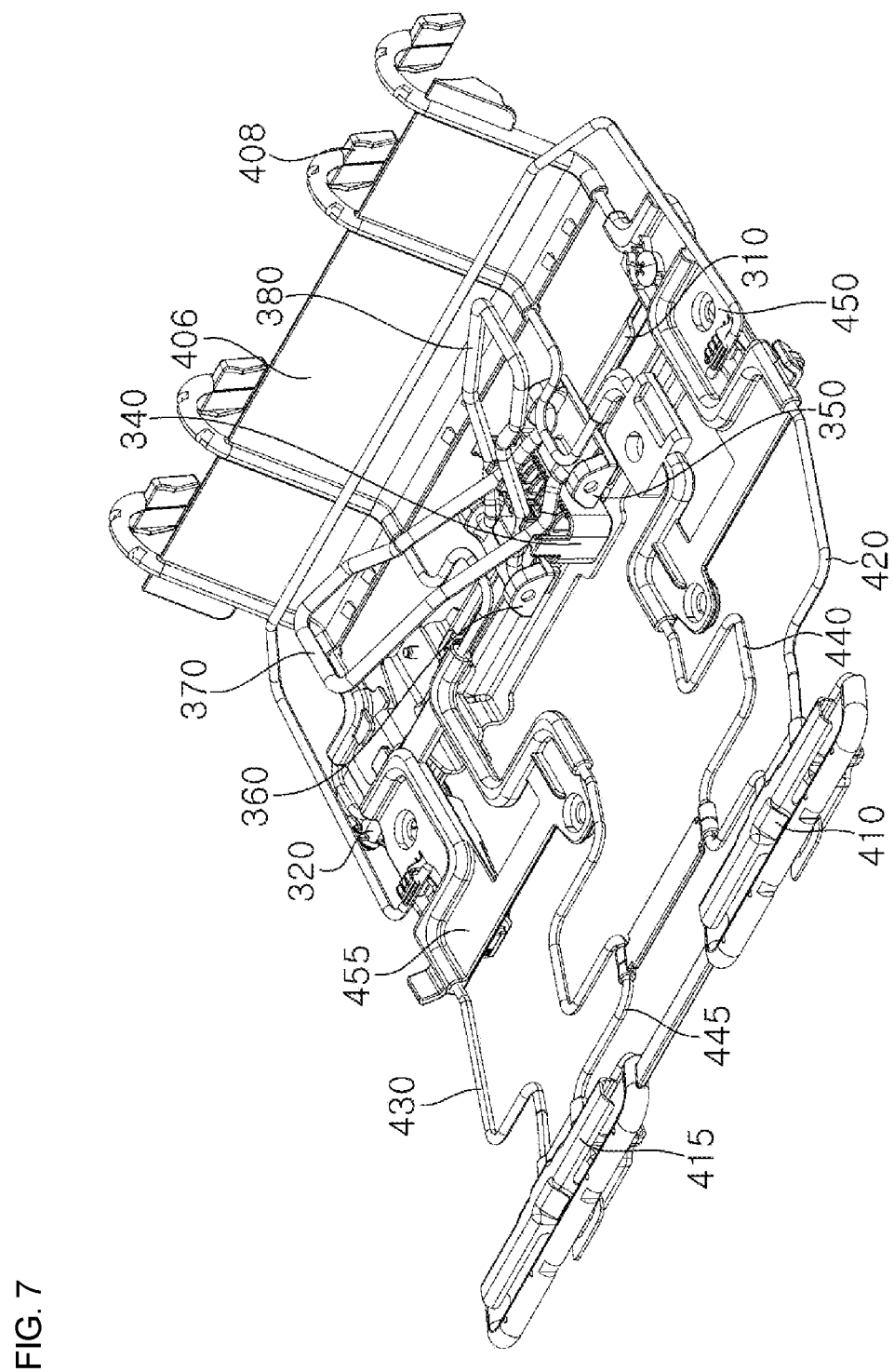
FIG. 7 is an exploded view of the rear bracket and the second support driver illustrated in FIG. 1.

As illustrated in FIGS. 6 and 7, the lower support 400 includes a rear bracket 405, front brackets 410 and 415, a first lower support member 420, a second lower support member 430, a third lower support member 440, a fourth lower support member 445, central brackets 450 and 455, a fifth lower support member 460, a second cushion 470, and fixed brackets 480.

As illustrated in FIGS. 1 and 6, one end of the lower support 400 is coupled to a pivot shaft 21 provided at the rear of the seat cushion frame 20, and the other end of the lower support 400 extends forward a predetermined distance within the seat cushion frame 20 to be coupled to the seat cushion frame 20.

Specifically, the rear bracket 405 includes a bracket body 406 and a ring member 408.

The bracket body 406 is provided in the shape of a rectangular plate obliquely extending forward and downward. Portions of the first lower support member 420, the second lower support member 430, the third lower support member 440, and the fourth lower support member 445 are inserted into the bracket body 406.

The ring member 408 is provided in the shape of an arch protruding upward from the upper portion of the bracket body 406 to extend parabolically backward, and is coupled to the pivot shaft 21 while surrounding the upper portion of the pivot shaft 21.

The front brackets 410 and 415 are disposed in front of one side and the other side of the rear bracket 405, at positions spaced apart predetermined distances from the rear bracket 405, respectively, and are coupled to the other ends of the first to fourth support members 420, 430, 440, and 445.

One end of the first lower support member 420 is inserted into one side of the bracket body 406 and is coupled to the bracket body 406, and the other end of the first lower support member 420 extends forward through the central bracket 455 and is coupled to the front bracket 410.

One end of the second lower support member 430 is inserted into the other side of the bracket body 406 and is coupled to the bracket body 406, and the other end of the second lower support member 430 extends forward through the central bracket 455 and is coupled to the front bracket 415.

One end of the third lower support member 440 is inserted into the bracket body 406 on the other side of the first lower support member 420 and is coupled to the bracket body 406, and the other end of the third lower support member 440 extends forward through the central bracket 455 and is coupled to the front bracket 410.

One end of the fourth lower support member 445 is inserted into the bracket body 406 at a position between the third and second lower support members 450 and 430 and is coupled to the bracket body 406, and the other end of the fourth lower support member 445 extends forward through the central bracket 455 and is coupled to the front bracket 415.

The central bracket 450 is coupled to the first and third lower support members 420 and 440 between the rear bracket 405 and the front bracket 410 and is coupled to the second support driver 500 through the fixed bracket 480.

The central bracket 455 is coupled to the second and fourth lower support members 430 and 450 between the rear bracket 405 and the front bracket 415 and is coupled to the second support driver 500 through the fixed bracket 480.

One end of the fifth lower support member 460 is provided in the shape of a stick obliquely extending backward and upward and is coupled to the central bracket 450 about a shaft extending to one side and the other side, and the central portion of the fifth lower support member 460 is perpendicularly bent from one end toward the other side of the fifth lower support member 460 and then extends a predetermined distance.

The other end of the fifth lower support member 460 is perpendicularly bent forward and downward from the central portion of the fifth lower support member 460, obliquely extends a predetermined distance, and is coupled to the central bracket 455 so as to be pivotable about a shaft extending to one or the other side.

The second cushion 470 is provided in the shape of a rectangular plate extending to one side or the other side. Both side and upper peripheral portions of the second cushion 470 are coupled to the fifth lower support member 460, such that the second cushion 470 pivots together with the fifth lower support member 460.

The fixed brackets 480 are coupled to the lower portions of the central brackets 450 and 455, respectively. One side and the other side of the second support driver 500 are coupled to the lower support 400 through the fixed brackets 480.

The second support driver 500 is substantially the same as the first support driver 300, except for being coupled to the lower support 400. Thus, the same reference numerals and names will be used and repetitive descriptions will be omitted.

The second support driver 500 includes a first support bracket 310, a first motor 320, first lead screws 330 and 335, a connecting socket 338, a support block 340, first nuts 350 and 360, and first links 370 and 380.

One side of the first support bracket 310 is detachably coupled to the lower portion of the fixed brackets 480 disposed on one side, and the other side of the first support bracket 310 is coupled to the fixed brackets 480 disposed on the other side.

In a position in which the first support bracket 310 is coupled to the fixed brackets 480, the support block 340 and the first nuts 350 and 360 are disposed below the third and fourth lower support members 440 and 450.

In a position in which the first nuts 350 and 360 are disposed at positions adjacent to the support block 340, the other ends of the first links 370 and 380 are moved upward by the support block 340, and the second cushion 470 in close contact with the first links 370 and 380 is moved upward.

When the first nuts 350 and 360 are moved to one side and the other side while being spaced apart from the support block 340, the other end of each of the first links 370 and 380 is moved downward by the weight of the occupant.

Thus, the support assembly 100 may advantageously support the buttocks, the back, and the pelvis of the occupant due to the first support driver 300 disposed on the seatback frame 10 and the second support driver 500 disposed on the seat cushion frame 20.

In addition, since the first and second support drivers 300 and 500 have the same shape, fabrication cost may be reduced. Due to the structure in which the first links 370 and 380 are disposed to intersect each other, the point at which the weight of the occupant is concentrated may be efficiently raised. Thus, the support drivers may be used in seats having a variety of sizes, thereby advantageously improving compatibility. The durability of the support drivers may also be advantageously improved.

Although the foregoing exemplary embodiments of the present disclosure have been described with reference to the accompanying drawings, the embodiments described in the specification and the configurations illustrated in the drawings are merely best modes of the present disclosure, rather than representing all aspects of the scope of the present disclosure. It should be understood that a variety of equivalents and alternative embodiments could be made at a point in time at which the present application was filed. Accordingly, the foregoing embodiments shall be interpreted as being illustrative, while not being limitative, in all aspects. It should be understood that the scope of the present disclosure shall be defined by the appended Claims rather than by the foregoing embodiments, and that all of modifications and alterations derived from the definition of the Claims and their equivalents fall within the scope of the present disclosure.

What is claimed is:

1. A support driver supporting a cushion pivotably coupled to a seat frame, the support driver comprising:
   a lead screw disposed at the rear of the cushion, connected to a drive shaft of a motor, and comprising threads provided on one side and the other side to extend in opposite directions;
   nuts screw-coupled to one side and the other side of the lead screw, with a rear surface thereof being coupled to the seat frame so as to be movable to one side or the other side;
   a support block coupled to the seat frame on a central portion of the lead screw and protruding more forward than the nuts; and
   links each comprising one end coupled to a corresponding nut of the nuts so as to be pivotable about a shaft extending in a top-bottom direction, an other end being in close contact with the rear surface of the cushion, and a part between the one end and the other end being intersected with corresponding part of the other link at the support block, and slidably guided and supported by the support block,
   wherein the nuts are moved toward the support block following forward pivoting of the lead screw in response to an operation of the motor, and the other ends of the links push the cushion.

2. The support driver according to claim 1, further comprising a bracket-shaped support bracket extending toward one side or the other side from a position at the rear of the support bracket and coupled to the seat frame.

3. The support driver according to claim 1, wherein the support block comprises guides protruding forward from positions spaced apart the same distance from an upper portion or a lower portion, the guides being alternating with the links.

4. A support assembly comprising:
   a first cushion pivotably coupled to a back frame of a seat frame;
   a first support driver comprising a lead screw configured to pivot in response to an operation of a motor, a support block coupled to the lead screw, nuts coupled to the lead screw on one side and the other side of the support block, and links each comprising one end coupled to a corresponding nut of the nuts so as to be pivotable about a shaft extending in a top-bottom direction, an other end being in close contact with the rear surface of the first cushion, and the part between the one end and the other end being intersected with corresponding part of the other link at the support block and slidably guided and supported by the support block;
   a second cushion pivotably coupled to a bottom frame of the seat frame; and
   a second support driver disposed on a lower portion of or below the second cushion and configured such that a portion thereof is moved upward to push the second cushion upward or is moved downward in response to an operation of a lower motor,
   wherein threads are provided on one side and the other side of the lead screw to extend in opposite directions, and rear surfaces of the nuts are coupled to the seat frame to slide to both sides through a bracket.

5. The support assembly according to claim 4, wherein the first support driver further comprises a bracket-shaped support bracket extending toward one side or the other side from a position at the rear of the support bracket and coupled to the seat frame.

6. The support assembly according to claim 4, wherein the support block comprises guides protruding forward from positions spaced apart the same distance from an upper portion or a lower portion, the guides being alternating with the links.

* * * * *